Feb. 22, 1938.     F. C. MOCK     2,109,298
INTERNAL COMBUSTION ENGINE
Filed Dec. 10, 1935     2 Sheets-Sheet 1
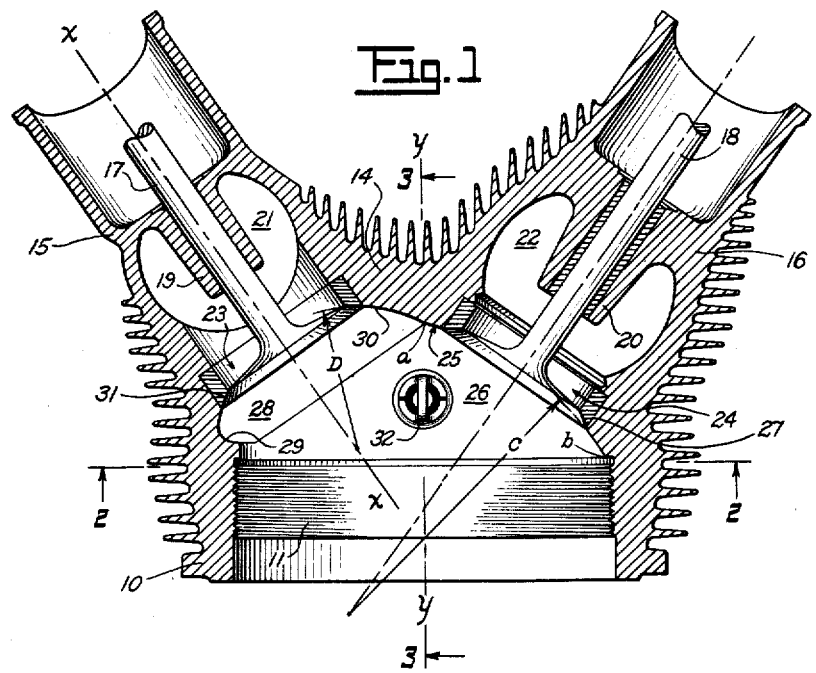
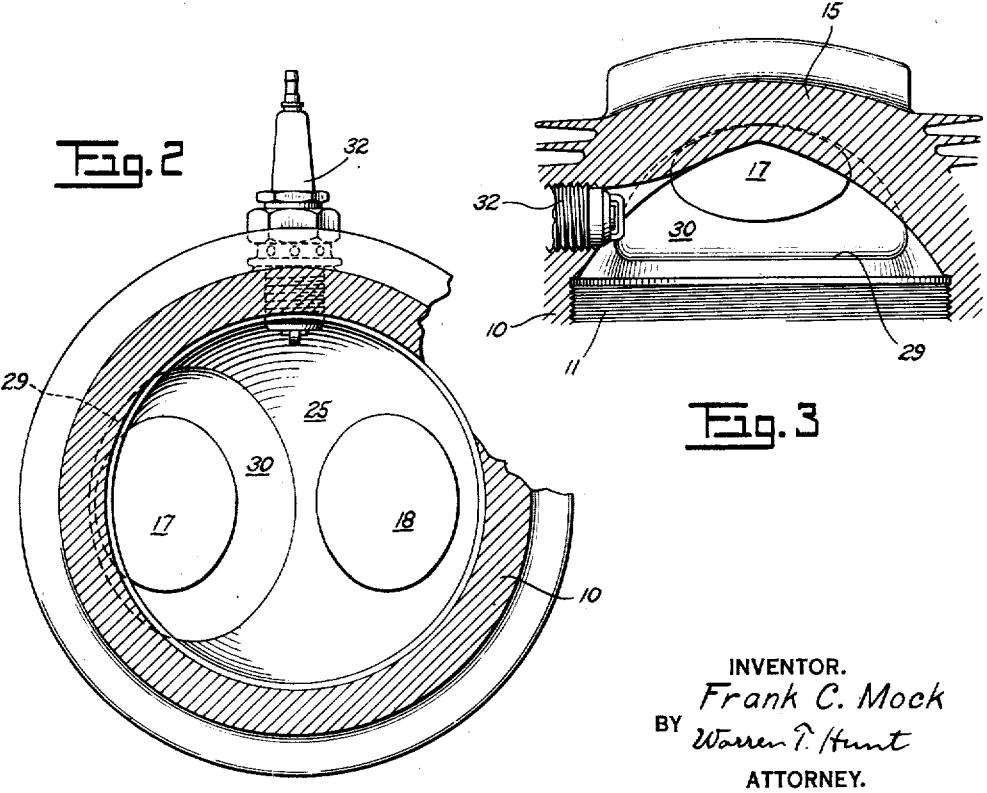
INVENTOR.
*Frank C. Mock*
BY *Warren T. Hunt*
ATTORNEY.

Feb. 22, 1938.   F. C. MOCK   2,109,298
INTERNAL COMBUSTION ENGINE
Filed Dec. 10, 1935   2 Sheets—Sheet 2
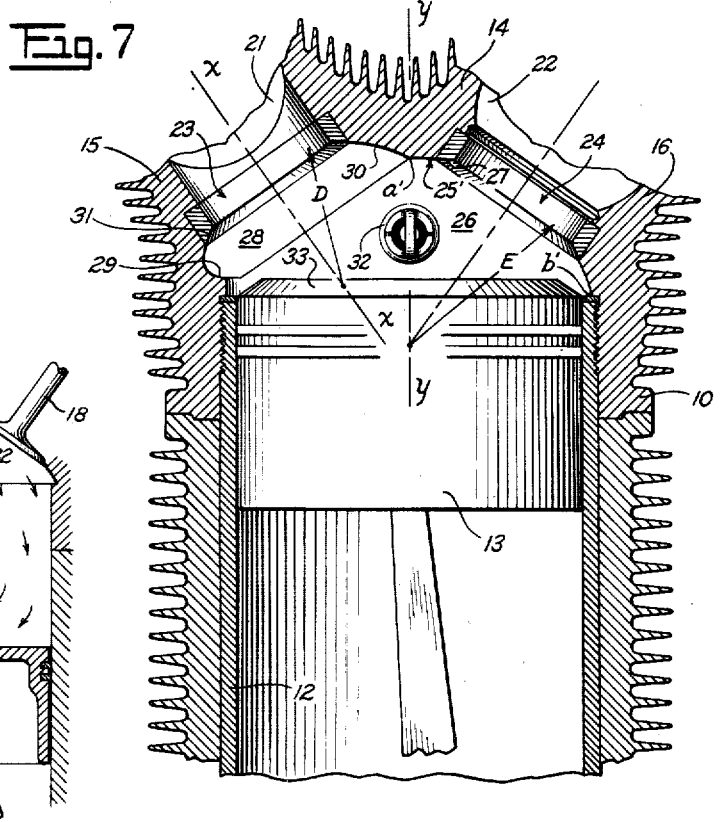
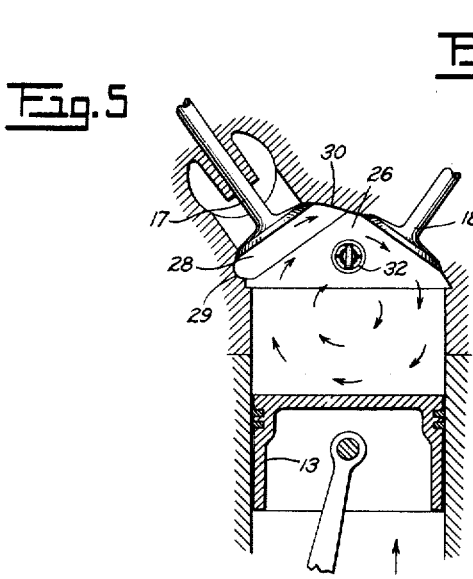
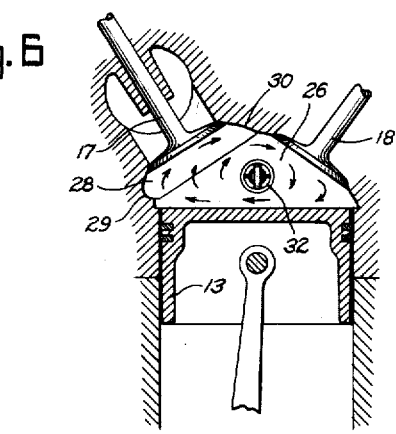
INVENTOR.
Frank C. Mock
BY Warren T. Hunt
ATTORNEY.

Patented Feb. 22, 1938

2,109,298

UNITED STATES PATENT OFFICE 2,109,298

INTERNAL COMBUSTION ENGINE

Frank C. Mock, Montclair, N. J., assignor to Eclipse Aviation Corporation, East Orange, N. J., a corporation of New Jersey Application December 10, 1935, Serial No. 53,822

9 Claims. (Cl. 123—191)

This invention relates to internal combustion engines, and more particularly to a means for circulating a charge in a cylinder thereof to create a mixing turbulence.

One of the objects of the present invention is to provide a novel means for circulating a fuel charge and combustion supporting medium within the cylinder of an internal combustion engine whereby more efficient engine operation may be obtained.

Another object of the invention is to provide a novel cylinder head which is so constructed as to direct an incoming charge of air or combustible mixture in such a manner as to create uniform and effective turbulence thereof in the engine cylinder.

Still another object of the invention is to provide novel means for creating turbulence in an internal combustion engine cylinder which may be maintained until the charge is ignited and burned.

A further object is the provision of a means for creating a novel state of turbulence in an internal combustion engine cylinder which is conducive to rapid and complete combustion of the charge, thereby minimizing the necessary spark advance for efficient operation and accordingly decreasing detonation and pre-ignition tendencies.

A still further object is to provide an internal combustion engine comprising a novel cylinder head for initially directing air currents in said cylinder to create a mixing turbulence whereby lean mixture charges may be readily ignited and smooth, efficient combustion obtained with a minimum number of ignition points, thereby enhancing the overall efficiency of the engine and minimizing the possibility of failure of the charge to fire.

The above and further objects and novel features of this invention will more fully appear from the following detailed description, when taken in connection with the accompanying drawings. It is to be expressly understood, however, that the drawings are for the purpose of illustration only and are not designed as a definition of the limits of the invention, reference being primarily had for this purpose to the appended claims.

In the drawings, wherein like reference characters refer to like parts throughout the several views, Fig. 1 is a sectional view of one form of cylinder head embodying the present invention;

Fig. 2 is a bottom view, partly in section and with parts broken away, taken on line 2—2 of Fig. 1;

Fig. 3 is a detail section, with certain parts broken away, taken on line 3—3 of Fig. 1;

Figs. 4, 5 and 6 are diagrammatic views illustrating currents in a cylinder of an engine embodying the present invention at different positions of the piston on the suction and compression strokes; and Fig. 7 is a side elevation, partly in section and with certain parts broken away, showing a second embodiment of the invention.

One form of the invention is illustrated, by way of example, in Figs. 1–6 inclusive, embodied in a cylinder head adapted for use with a radial type, air-cooled engine. As shown, the cylinder head comprises a short cylindrical portion 10 having a threaded surface 11 on the interior thereof whereby the head may be secured to the usual cylinder liner. The upper portion 14 of the cylinder head has a pair of diametrically disposed extensions 15 and 16 which constitute housings for the intake and exhaust valves 17 and 18, (Fig. 1) respectively, and are provided with suitable guides 19 and 20 for said valves. Chambers 21 and 22 within extensions 15 and 16 communicate with the engine cylinder through ports 23 and 24 which are controlled by valves 17 and 18 and suitable connections (not shown) may be provided between said chambers and the intake and exhaust manifolds of the engine.

In the operation of an internal combustion engine, whether the same be of the vapor or solid fuel injection type, and irrespective of the principle upon which the same operates, it is highly desirable and necessary for most efficient operation that the charge of fuel and combustion supporting medium be rendered turbulent and that the turbulence be of such nature as to insure a proper distribution of the fuel charge throughout the charge of said combustion supporting medium within the cylinder. For best results, such turbulence should exist from the moment that the combustible mixture enters the engine cylinder until the same is started burning, thus allowing a maximum time for complete distribution of fuel in the combustion chamber, enhancing the rate of combustion, and insuring complete burning of the charge. In solid fuel injection engines, the turbulence should exist at the time the fuel charge is injected.

The novel cylinder head comprehended by the present invention is so constructed as to exert an initial directing influence upon the charge of combustible mixture entering the cylinder through the intake port whereby said charge flows within the cylinder and combustion chamber in a novel manner to create a mixing turbulence which is maintained throughout the suction and compression strokes of the engine piston. The initial currents, by reason of the contour of the cylinder head walls and the position of the intake valve relative thereto, are so directed with respect to the axis of the engine cylinder that the movement of the engine piston and the contour of the combustion chamber assist in the maintenance and direction of said currents and even increase the turbulence of the charge.

For the purpose of directing the flow of the charge in the novel manner embraced by this invention, valves 17 and 18 in the embodiment illustrated are inclined at an angle to the axis Y—Y of the engine cylinder and the inner surface 25 of cylinder head 10, 14, constituting the upper and side walls of a combustion chamber 26, is, except as hereinafter pointed out, a surface of revolution generated by revolving an arc of a circle about the central cylinder axis Y—Y, said arc being designated $a$—$b$ (Fig. 1) and having a radius C. The center of curvature and radius of said arc are preferably chosen so that the arc will intersect the inner surface of the head, closely adjacent the upper end of cylindrical portion 10 of the cylinder head and allow a proper clearance above piston 13 (Fig. 6) when the same is at the top of its stroke. In the illustration of Fig. 1, arc $a$—$b$ has a radius C with a center of curvature in the plane of said arc and axis Y—Y, said center and arc being on opposite sides of said axis. The profile of the surface of revolution thus formed is the shape of a Gothic arch, as is most clearly seen in Fig. 3. In order that a seat 27 for exhaust valve 18 may be provided in the curved wall 25 of cylinder head 14 and in a plane at right angles to the axis of the valve stem, the position of the center of curvature of arc $a$—$b$ is preferably so chosen that the extended axis of said exhaust valve will intersect the locus of said center when arc $a$—$b$ is revolved about axis Y—Y to generate wall 25.

As heretofore pointed out, this invention comprises a novel means for circulating a charge in an engine cylinder whereby said charge may be more readily ignited, flame propagation may be rendered more uniformly progressive, and combustion of the charge rendered more complete in a shorter space of time than in engines heretofore provided. Such means consists, in part, in initially directing the incoming charge from one side to the other of the cylinder in two converging sheets having a width approaching the diameter of said cylinder. Said sheets of air or mixture are directed downwardly at slightly different angles and accordingly converge along one side of the cylinder at a point intermediate the ends thereof, as illustrated in Fig. 4. This initial directing influence for flow of the charge is obtained by inclining intake valve 17 to axis Y—Y and seating the same in a recess 28 formed in the inner wall of the cylinder head, said recess terminating at its lower edge in a ledge or shelf 29 which extends for a substantial distance around the periphery of the cylinder.

In the form illustrated, surface 30 of flow directing recess 28 corresponds in shape, with the exception of ridge or deflecting surface 29, to a surface of somewhat more than one-half of a segment of a sphere having a radius D which is greater, for example, than the radius of the head of valve 17. The center of curvature of surface of revolution 30 is preferably located on axis X—X of the intake valve 17 in order that a seat 31 for said valve may be provided in curved surface 30 and in a plane perpendicular to said axis. In order that deflecting surface or ledge 29 may be formed without a portion of the same projecting inwardly beyond the plane of the cylinder walls and overhanging the piston, the axis X—X is so positioned and the center of curvature of surface 30 is chosen so that radius D will be greater than the shortest distance from said center to the upper edge of the inner wall of cylindrical portion 10. The width of ledge 29 in a radial direction will thus be greatest at the center line of recess 28 and gradually decrease toward each end thereof. The corner of ledge 29 is preferably contained in a plane perpendicular to axis Y—Y and the surface of said ledge is preferably a plane surface inclined downwardly at a small angle to said axis, the same being joined to surface 30 by a fillet to reduce resistance to air flow. Surface 29 is thus adapted to deflect air or a combustible mixture entering the cylinder head around the lower portion of valve 17 and direct the same in a comparatively wide, plane sheet transversely of the engine cylinder to the opposite side thereof.

The uppermost edge of valve seat 31 is above the highest point $a$ of surface 25, and accordingly the upper part of surface 30 is inclined downwardly in the same direction as, but preferably at a greater angle than, surface 29. In view of the fact that the radius of curvature D of surface 30 is considerably greater than the radius of valve port 23, the combustible mixture entering around the upper portion of valve 17 will be spread out along said surface and be directed downwardly in a curved path in the form of a slightly curved sheet which will converge and join with the sheet of mixture proceeding from surface 29 along the right-hand wall of cylinder wall 12, as seen in Fig. 4.

When the sheets of mixture directed downwardly and transversely of the cylinder meet the wall of cylinder liner 12 (Fig. 7) the currents are turned downwardly along the cylinder wall. The momentum of the charge causes the same to continue its downward movement while the substantial vacuum in the left-hand side of the cylinder, as viewed in Fig. 4, causes the currents to turn toward the left and strike the top of piston 13 at an angle whereby the same are deflected upwardly along the left side of the cylinder. A whirling mass is thus set up having its axis of rotation extending transversely of the engine cylinder and substantially perpendicular to the plane of axes X—X and Y—Y.

The currents of combustible mixture whirling in the above manner about a horizontal axis are not disturbed but rather accelerated and the whirling motion thereof continued by the upward movement of piston 13, the center of rotation of the fluid mass moving upwardly with said piston (Fig. 5). The continuance of the whirling motion of the mixture is also promoted by the curved and hence somewhat streamlined surfaces of the cylinder head. As the piston moves upwardly in the cylinder, it will be noted that the curvature of the air currents is changed continuously because of the gradual decrease in the size of the chamber in which said currents are confined. Due to this change of curvature and the varying curvatures of the walls of the combustion chamber, local turbulences of small amplitude are set up in said currents which also contribute to rapid and complete burning of the charge after the same is ignited.

The charge may be fired either by the heat of compression in the engine cylinder as in engines operating on the Diesel principle, or by one or more spark plugs 32 which are preferably secured in the side wall 10 of cylinder head 14, by means of screw threads, and at such position that the igniting spark will occur at substantially the axis of the rotating or whirling mixture (Fig. 6). The ease with which the charge may be ignited is increased by thus positioning the spark plug since the centrifugal forces developed by the rapid whirling of the charge distributes the fuel particles in the combustion supporting medium in accordance with the weight of such particles, the cold and unvaporized fuel being thrown to the outside and the lighter or completely vaporized particles being retained at the center of the whirling mass. It will be readily apparent that the completely vaporized particles at the center of the whirling mass may be most readily ignited. Furthermore, the charge is least turbulent at the axis of the whirling mass, thereby further enhancing the ease with which the charge may be initially ignited, since high turbulence is a definite hindrance to the kindling of a flame, although such turbulence is extremely beneficial in propagating the flame once it has been kindled. The ease with which the charge may be ignited when the same is circulated in the engine cylinder in accordance with the novel means above described renders it possible to operate at cruising speeds on a leaner mixture without danger of misfire, thereby materially increasing the possible operating efficiency of the engine.

As above noted, the fuel particles are distributed by centrifugal action in the whirling mass in such a manner that the lightest or completely vaporized fuel particles are concentrated at the center of the mass and the cooler and heavier particles are thrown outwardly a distance proportional to the size and weight thereof, the largest particles being thrown to the outside. When the flame is started at the axis of the mass, the same spreads outwardly in all directions burning a uniformly increasing amount of fuel. Flame propagation is thus smoothly and uniformly increased during the burning of the charge and complete burning thereof is insured since the flame increases in intensity as it progressively reaches and ignites the heavier fuel particles. Flame propagation is also enhanced by the mixing turbulence which continues until the charge is burned. The increased speed at which the charge is burned makes it possible to employ less spark advance and accordingly decrease any detonation or pre-ignition tendencies.

A second embodiment of the invention illustrating a variation in the contour of the inner wall of the novel cylinder head is constituted by a surface of revolution 25' generated by revolving an arc a'—b' about the central axis of the cylinder head, said arc having a center of curvature on said axis and a radius E. The surface thus generated is that of a spherical segment slightly less than a hemisphere. The remainder of the structure of Fig. 7 is the same as that described for the embodiment of Fig. 1 except that it is noted that the clearance above piston 13 may be decreased by adding a portion 33 to the top of said piston.

There is thus provided a novel cylinder head for an internal combustion engine which is so constructed as to initiate the circulation of air or a combustible mixture within an engine cylinder in a novel manner whereby a lasting, uniform mixing turbulence is created by causing the charge to whirl about an axis extending transversely of the cylinder and adapted to move upwardly with the engine piston substantially in alignment with the ignition means when ignition occurs. The novel means for circulating a combustible charge hereby provided greatly increases the efficiency of the engine in which the same is employed. Although only two embodiments of the invention have been illustrated and described, it is to be expressly understood that the same is not limited thereto but that various changes may be made in the design and arrangement of parts illustrated without departing from the spirit and scope of the invention, as will now be apparent to those skilled in the art. Reference will be primarily had to the appended claims for a definition of the limits of the invention.

What is claimed is:

1. In an internal combustion engine, a cylinder, a cylinder head therefor, having a combustion space therein and an intake port in one side thereof, a valve for said port having its axis inclined to the axis of said cylinder, said cylinder head having its combustion space defined by two intersecting curved surfaces, one of which is a surface of revolution coaxial with said valve and has a center of curvature between the cylinder axis and the valve, and has a curvature radius greater than the distance between the center of curvature and the cylinder wall adjacent the valve, a ledge beneath the lower edge of said valve having a surface extending radially of the cylinder and merging with the surface of revolution, said ledge extending for a substantial arc around the inner periphery of said head for directing fluid flow from said port to the other side of the cylinder.

2. In an internal combustion engine, a cylinder, a cylinder head having a combustion space and having an intake port therein, a valve for said port included at an angle to the longitudinal axis of said cylinder, said cylinder head having its combustion space defined by two intersecting curved surfaces, one of which is a surface of revolution coaxial with said valve and has a center of curvature between the cylinder axis and the valve, and has a curvature radius greater than the distance between the center of curvature and the cylinder wall adjacent the valve, and a ledge adjacent the lower edge of said valve having a plane surface merging with the surface of revolution for deflecting fluid from said port transversely of said cylinder.

3. In an internal combustion engine, a cylinder, a head for said cylinder having a dome-like combustion chamber therein defined by two intersecting surfaces of revolution, one of said surfaces over-hanging the cylinder wall to form a recess in the walls of said chamber, a valve port and seat in said recess, and a valve for said port having its axis inclined to the axis of said cylinder whereby a fluid flowing through said port and by said valve, is deflected by the walls of said recess and directed transversely of said cylinder.

4. In an internal combustion engine, a cylinder, a cylinder head therefor having a combustion space and a port therein, a valve for said port having its axis inclined to the axis of said cylinder, said cylinder head having its combustion space defined by two intersecting curved surfaces, one of which is a surface of revolution coaxial with said valve and has a center of curvature between the cylinder axis and the valve, and has a curvature radius greater than the distance between the center of curvature and the cylinder wall adjacent the valve, and a ledge having a plane upper surface adjacent the lower edge of said valve merging with the surface of revolution and extending about the inner periphery of said cylinder head for an arc of greater length than the diameter of the face of said valve, whereby flow from said port is directed across the cylinder.

5. In an internal combustion engine, a cylinder having a head thereon, an intake port in said head, a dome-like combustion chamber in said head defined by two intersecting surfaces of revolution, one of said surfaces overhanging the cylinder to form an air directing recess in one side of said chamber and surrounding said intake port, whereby a whirling motion of said air about an axis perpendicular to the axis of said cylinder is initiated, and an ignition means in the side of said combustion chamber and spaced ninety degrees from the center of said recess.

6. In an internal combustion engine, a cylinder, a cylinder head therefor, having a combustion space therein defined by two intersecting surfaces of revolution both of which are curved with respect to their axes, one of said surfaces being arranged to overhang the cylinder to form a recess, a port therein, a valve for said port, said recess having a curved wall, the radius of curvature of which is less than the radius of the cylinder and greater than the radius of said valve port, and a ledge having a plane surface constituting the lower wall of said recess and being of greater length than the diameter of said port.

7. In an internal combustion engine, a cylinder, a cylinder head the interior of which is defined by two intersecting surfaces of revolution and having a valve port therein coaxial with one surface, a valve for said port, and said coaxial surface being arranged to overhang the cylinder to form a recess, an internal ledge having a plane surface adjacent one edge of said valve to form the bottom of the recess, said ledge having a greater length than the diameter of said port and being adapted to deflect gases entering said port past the adjacent edge of said valve in a sheet transversely of said cylinder.

8. In an internal combustion engine, a cylinder having a piston therein and a head thereon, an intake port in said head, a dome-like combustion chamber in said head, an air directing ledge in one side of said chamber and arranged adjacent said intake port to cause a mass of incoming air to whirl about an axis perpendicular to the cylinder axis, and an ignition means in the side of said combustion chamber arranged to substantially align with the axis of the whirling mass of air when the piston is at its innermost position.

9. In an internal combustion engine, a cylinder having a piston therein and a head thereon, said head having a combustion space defined by two intersecting surfaces of revolution, an intake port having a valve in said head, an exhaust port having a valve in said head, one of said surfaces being coaxial with the intake valve and overhanging the cylinder to form a recess, an air directing ledge in one side of said head forming the bottom of the recess and arranged adjacent the intake port to cause a mass of incoming air to whirl about an axis perpendicular to the cylinder axis, said exhaust valve being arranged opposite to said ledge and in position to be swept by the outer portion of the mass of whirling air.

FRANK C. MOCK.